April 5, 1960   F. S. INGLESE   2,931,453
OIL DRIP PAN FOR MOTOR VEHICLES
Filed Sept. 8, 1958   2 Sheets-Sheet 1

INVENTOR.
FRANK S. INGLESE
BY
*Salvatore G. Militana*
ATTORNEY

April 5, 1960   F. S. INGLESE   2,931,453
OIL DRIP PAN FOR MOTOR VEHICLES
Filed Sept. 8, 1958   2 Sheets-Sheet 2
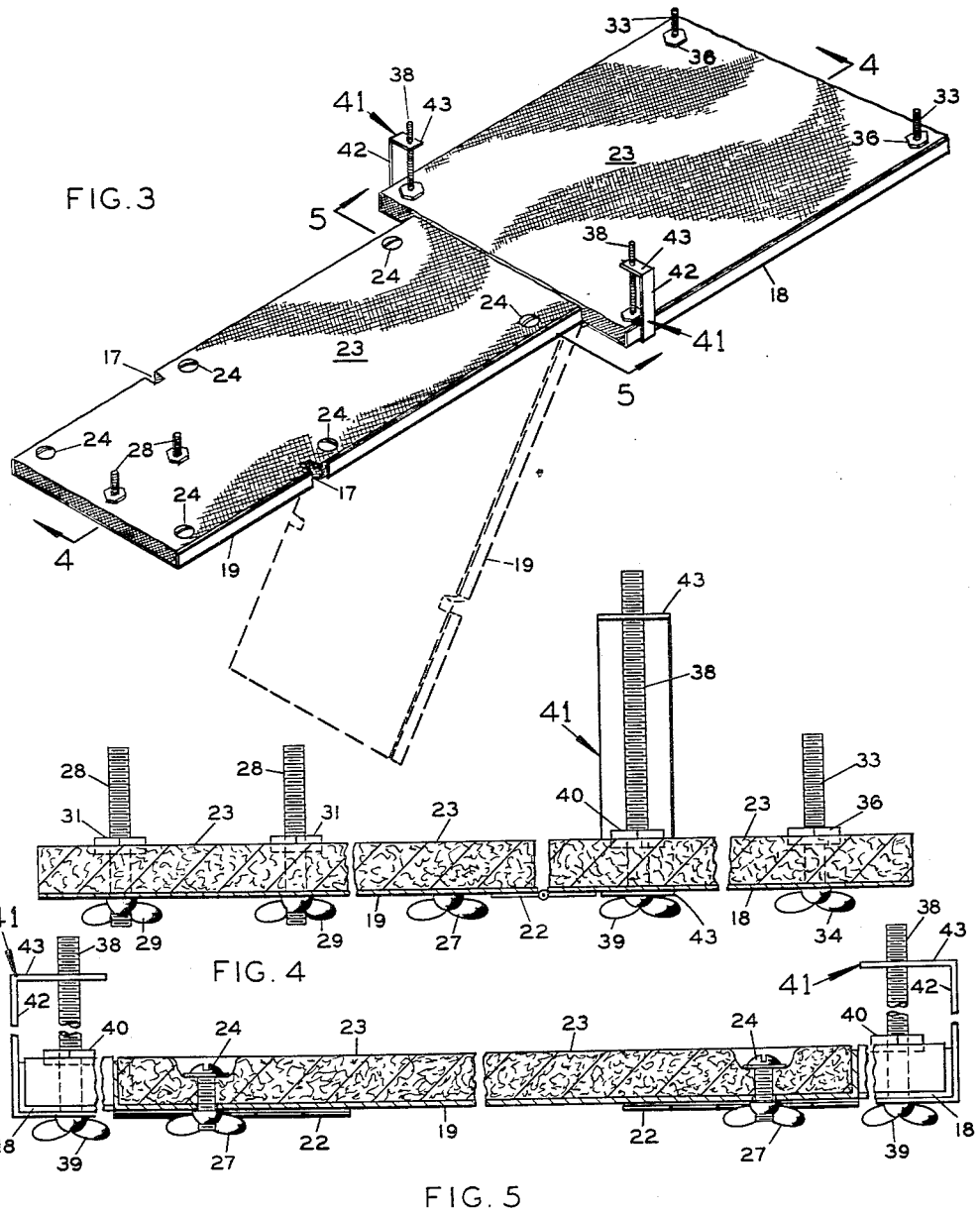
INVENTOR.
FRANK S. INGLESE
BY
ATTORNEY

United States Patent Office 2,931,453
Patented Apr. 5, 1960

2,931,453

OIL DRIP PAN FOR MOTOR VEHICLES

Frank S. Inglese, Opa Locka, Fla.

Application September 8, 1958, Serial No. 759,527

2 Claims. (Cl. 180—69.1)

This invention relates to oil drip pans and is more particularly directed to pans that are attached to a motor vehicle for catching oil dripping from its engine, etc.

A principal object of the present invention is to provide an oil drip pan for automative vehicles which is readily attached to the undercarriage of a motor vehicle and which does not interfere with the operation thereof.

Another object of the present invention is to provide an oil drip pan for automotive vehicles with a hinged section to permit the swinging of a portion of the oil drip pan out of the way of the crankcase oil plug to permit the removal of the oil as is done customarily at certain periodical intervals.

Another object of the present invention is to provide an oil drip pan for automotive vehicles with a sheet of felt material contained therein for absorbing the oil that has dripped therein and thereby preventing the spilling of the oil from the pan.

A still further object of the present invention is to provide a drip pan for a motor vehicle described as above and secured to the motor vehicle in such a manner that the drip pan may be readily mounted and removed yet will not vibrate or rattle so as to cause any noise or vibrations when the motor vehicle is in motion.

In the drawings:

Figure 3 is a perspective view of my drip pan.

Figures 4 and 5 are cross sectional views taken along the lines 4—4 and 5—5 respectively of Figure 3.

Figure 1:
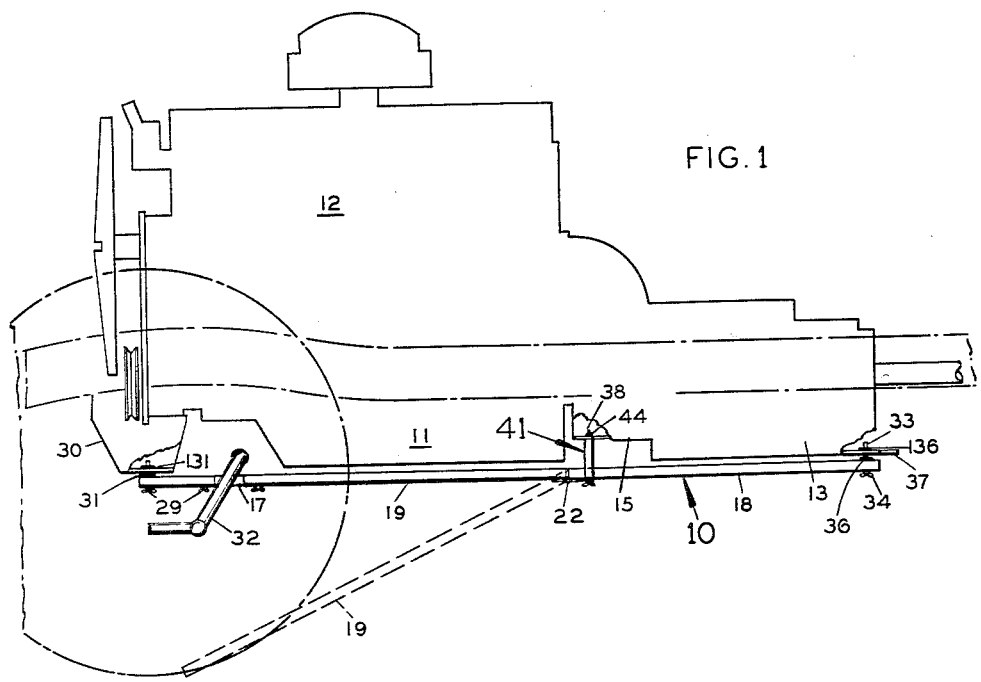
Figure 1 is a side elevational view of the forward end of a motor vehicle showing an oil drip pan embodying my invention with the dotted lines indicating a forward portion thereof swung out of position.
Figure 2:
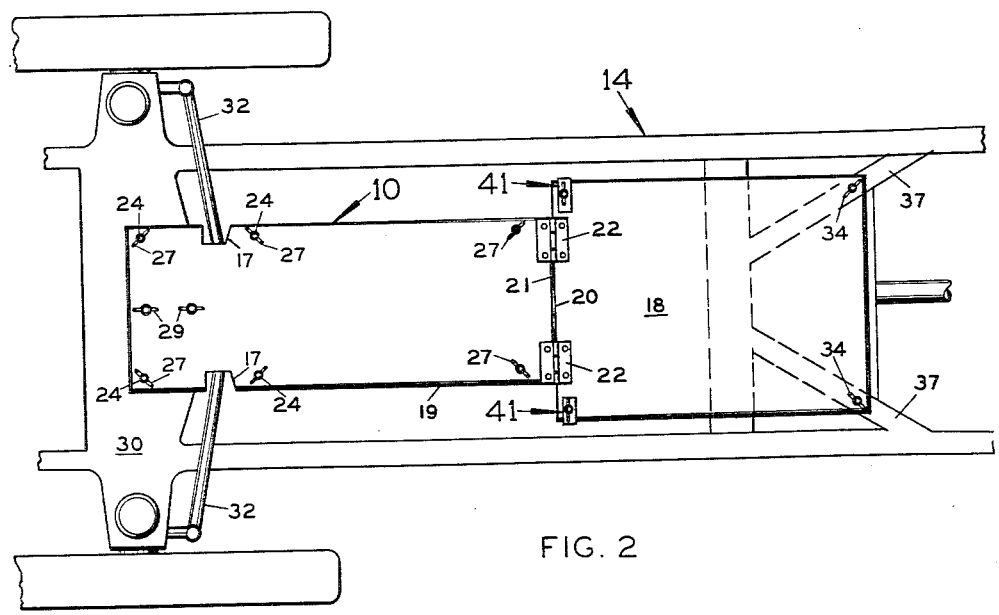
Figure 2 is a bottom plan view.

Referring to the drawings wherein like numerals are used to designate similar parts throughout the several views, the numeral 10 refers to my drip pan shown by Figures 1 and 2 mounted below a crank case 11 of an engine 12 and transmission 13 of a motor vehicle 14 shown only in part. It is a well known fact that oil and grease will drip from the crank case 11 mounted on the lower portion of the engine or motor 12 as well as the transmission 13 and the clutch housing 15 positioned between the transmission 13 and the crank case 11.

The drip pan 10 comprises portions 18 and 19 each constructed of a length of sheet metal with all four edges turned up to form a shallow pan. The pans 18 and 19 are made of such size as to amply cover the areas where leakages or drippings of oil occur, the pan 19 being longer and narrower than the pan 18 since the crank case 11 is longer and narrower in size than the combined clutch housing 15 and transmission housing 13. A forward edge 20 of the rear pan 18 is pivotally secured to a rear edge 21 of the front pan 19 by means of a pair of double leaf hinges 22. Within the pans 18 and 19 there is placed a sheet of absorbent material 23 such as felt and the like for absorbing oil which has dripped in the pans 18 and 19 to prevent the oil from leaking out of the pans 18 and 19 when the automobile is in motion.

Means are provided for removably securing the felt pad 23 in the pan 19, comprising a plurality of bolts 24 mounted about the edge portion of the pan 19. The bolts 24 extend through bores in the felt pad 23 and pan 19 and have threaded on their ends wing nuts 27 for bringing the heads of the bolts 24 tightly against the felt pad 23. Also at the forward portion of the drip pan 19 is a pair of elongated bolts 28 extending through bores in the pan 19 and in the felt pad 23 being secured thereon by a nut 31 threaded down against the felt pad 23 and a wing nut 29 secured to the lower end of the bolt 29 and abutting against the pan 19 to fasten the pad 23 within the pan 19.

The free ends of the bolt 28 extend above the pad 23 and are received by openings in a cross member 30 of the frame of the motor vehicle 14. Nuts 131 are threaded on the bolts 28 to secure the pan 19 in position as shown. A notch or slot 17 is cut on each side edge of the pan 19 to prevent inwardly extending tie rods 32 from scraping against the side edges of the pan 19.

The rear pan 18 is provided with a pair of bolts 33 similar to the previously described bolts 28 for securing the rear portion of the pan 18 to a pair of diagonal cross members 37 forming a part of the frame of the motor vehicle 14. The bolts 33 which are provided with wing type heads 34 and a nut 36 threaded thereon extend through bores in the cross members 37 and have a nut 136 threaded thereon to secure the pan to the frame members 37. At the forward edge of the pan 18 are two elongated bolts 38 provided with a head 39 and extending through bores in the pan 18 and felt pad 23 in an upward direction. A nut 40 threaded on each of the bolts 38 retain the felt pad 23 within the pan 18. Since the lower surface of the clutch housing 15 is at a higher level than that of the transmission housing 13, the bolts 38 are longer than the bolts 33 and are each provided with a spacer bracket 41 consisting of a vertical leg portion 42 having horizontal leg portions 43 at each end thereof extending at approximately right angle thereto. The horizontal leg portions 43 are each provided with a bore for receiving the bolt 38, the lower leg portion 43 abutting against the lower surface of the pan 18 while the upper leg portion 43 is positioned above the pan 18. A nut 40 threaded downwardly on the bolt 38 tightens a head 39 against the pan 18 and thereby secures the pad 23, pan 18 and spacer brackets 41 together. The upper end of the bolt 38 extends into a bore in the lower wall of the clutch housing 15 and secured thereon by nuts 44. Upon tightening the nuts 44, the bolts 25 and pan 18 are drawn upwardly until the upper horizontal leg portions 43 of the spacers 41 abut against and engage the clutch housing 15 whereby the pan 18 is held secured thereon.

If it is desired to have access to the oil drain plug of the crank case 11, the wing nuts 29 are unthreaded and removed and the pan 19 is permitted to swing downwardly about the hinges 22. When the felt pads 23 have become saturated with oil, grease, etc., the other nuts 136, 44 are removed permitting the pans 18 and 19 to drop away from its position beneath the motor vehicle 14. Then the bolts 24 are removed from the pan 19 releasing the pad 23 therefrom. The pad 23 of the pan 18 is released upon unthreading the nuts 36 and 40 from the bolts 33 and 38 respectively. Fresh pads 23 are then replaced in the pans 18 and 19 and the nuts and bolts previously removed are now replaced in their position as shown and described.

Having described my invention, what I claim as new is:

1. An oil drip catcher for automotive vehicles adapted to be mounted beneath a crankcase and transmission housing comprising a pair of shallow receptacles having a bottom wall and upstanding side walls, a sheet of absorbent material positioned in each receptacle, bolt means removably securing said absorbent material in said receptacles, a hinge securing one end of one of said receptacles to an end of the other of said receptacles, bolt means mounted at the other end of said one of said receptacles for securing said receptacle beneath said transmission housing of said vehicle, bolt means removably securing the opposite end of said other of said receptacles beneath said crankcase, further bolt means mounted at said one end of said one receptacle, and spacer means mounted on said further bolt means for securing said one receptacle in spaced relation to said transmission housing.

2. An oil drip catcher for automotive vehicles, adapted to be mounted beneath a crankcase and transmission housing comprising a pair of shallow receptacles having a bottom wall and upstanding side walls, a sheet of absorbent material positioned in each receptacle, bolt means removably securing said absorbent material in said receptacles, a hinge securing one end of one of said receptacles to an end of the other of said receptacles, bolt means mounted at the other end of said one of said receptacles for securing said receptacle beneath said transmission housing of said vehicle, bolt means removably securing the the other end of said other of said receptacles beneath said crankcase, further bolt means mounted at said one end of said one receptacle, slots on each side of said other of said receptacles, and a spacer bracket having a vertical leg portion and a horizontal leg portion at each end of said vertical leg portion, one of said horizontal leg portions being positioned adjacent a lower surface of said bottom wall of said one of said receptacles, said vertical leg extending upwardly and said other of said horizontal leg extending at right angle in the direction of said further bolt means, said horizontal leg portions having a bore for receiving further bolt means whereupon the fastening of said further bolt means to said motor vehicle, said other of said horizontal leg portions engages said motor vehicle and supports said receptacle in spaced relation thereto.

References Cited in the file of this patent

UNITED STATES PATENTS

| | | |
|---|---|---|
| 925,783 | Miller | June 22, 1909 |
| 1,213,848 | Edgington | Jan. 30, 1917 |
| 2,770,389 | Drakoff | Nov. 13, 1956 |
| 2,783,848 | Beskid | Mar. 5, 1957 |